(12) United States Patent
Hudson et al.

(10) Patent No.: US 7,469,362 B2
(45) Date of Patent: Dec. 23, 2008

(54) USING A CALL STACK HASH TO RECORD THE STATE OF A PROCESS

(75) Inventors: William Hunter Hudson, Kirkland, WA (US); Vamshidhar Radha Kommineni, Kirkland, WA (US); Yi Meng, Bellevue, WA (US); Kenneth Kai-Baun Ma, Sammamish, WA (US); Gerald Francis Maffeo, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

(21) Appl. No.: 11/108,087

(22) Filed: Apr. 15, 2005

(65) Prior Publication Data

US 2006/0253837 A1    Nov. 9, 2006

(51) Int. Cl.
    *G06F 11/00*    (2006.01)
(52) U.S. Cl. .......................................... 714/45; 714/52
(58) Field of Classification Search .................. 714/38, 714/52, 45
    See application file for complete search history.

(56) References Cited

U.S. PATENT DOCUMENTS

| | | | | |
|---|---|---|---|---|
| 6,134,244 | A * | 10/2000 | Van Renesse et al. | 370/469 |
| 6,311,325 | B1 * | 10/2001 | Levine et al. | 717/128 |
| 6,513,133 | B1 | 1/2003 | Campbell | |
| 6,523,141 | B1 * | 2/2003 | Cantrill | 714/48 |
| 6,678,883 | B1 * | 1/2004 | Berry et al. | 717/128 |
| 6,874,105 | B2 * | 3/2005 | Buechner et al. | 714/39 |
| 6,914,910 | B1 * | 7/2005 | Van Renesse et al. | 370/466 |
| 7,039,833 | B2 * | 5/2006 | Knuutila et al. | 714/38 |
| 7,243,267 | B2 * | 7/2007 | Klemm et al. | 714/38 |
| 7,313,734 | B2 * | 12/2007 | DeWitt et al. | 714/45 |
| 7,321,988 | B2 * | 1/2008 | Guo et al. | 714/38 |
| 2003/0191940 | A1 * | 10/2003 | Sinha et al. | 713/176 |
| 2004/0039924 | A1 * | 2/2004 | Baldwin et al. | 713/189 |
| 2004/0064552 | A1 * | 4/2004 | Chong et al. | 709/224 |
| 2004/0078689 | A1 * | 4/2004 | Knuutila et al. | 714/38 |
| 2005/0257168 | A1 | 11/2005 | Cummins et al. | |
| 2006/0075306 | A1 * | 4/2006 | Chandrasekaran | 714/38 |
| 2006/0190773 | A1 * | 8/2006 | Rao et al. | 714/38 |
| 2008/0072102 | A1 * | 3/2008 | Elliott et al. | 714/38 |

* cited by examiner

*Primary Examiner*—Marc Duncan
*Assistant Examiner*—Joshua P Lottich
(74) *Attorney, Agent, or Firm*—Marshall, Gerstein & Borun LLP

(57) ABSTRACT

In embodiments of the invention, selected aspects of a process' call stacks are hashed, and the hash is used to capture the execution state of the process in a concise form and with minimal impact on the performance of the process and with no modification to the process code. The hash allows vendors and developers to classify failures in order to associate them with their known root causes to support rapid customer feedback and to maximize efficiency of correction. Further, the hash provides a metric usable to prioritize diagnosis of failures. In an embodiment of the invention, the identities of modules on the call stack are hashed in combination with some but not all offset information to minimize the affect of patches and minor changes to the code, and improve the ability to discriminate different execution paths.

12 Claims, 6 Drawing Sheets

| MODULE | FUNCTION |
|---|---|
| Ntdll | NtWaitForSingleObject |
| Kernel32 | WaitForSingleObject |
| Mshtml | RenderHtml |
| Iexplore | Browse |
| ⋮ | ⋮ |

FIGURE 3

USING A CALL STACK HASH TO RECORD THE STATE OF A PROCESS

FIELD OF THE INVENTION

This invention pertains generally to computer software evaluation and, more particularly, to a method and system of preserving an indication of the state of a computing system at a particular point in time using a selective call-stack hash.

BACKGROUND OF THE INVENTION

From their inception, computers have been fairly complicated machines, involving many different parts and circuits that must operate properly and interact properly for the computer to function as designed. As new and better computing technologies arise and more complex programs and programming techniques are employed, the complexity of computing systems continues to increase. Moreover, all facets of society and commerce increasingly rely on computing technology in mission critical scenarios. Thus, the complexity of computing systems and the stakes for failure of those systems continue to increase together, compounding the probability and impact of any errors in hardware or coding.

The development of software is a process that typically requires extensive human interaction. Thus, the potential for errors to be introduced is significant. While many of these errors can be identified and corrected before the software of interest is distributed, this is not always possible. Some errors only occur under very specific conditions, under circumstances that have not been tested by the developer of the software. For example, once a piece of software is distributed to the public, it will be combined with an essentially endless and unforeseeable variety of computer hardware and other programs. The program of interest may interact with any of these things in an unforeseen way.

Due to the complexities of software and the interactions between software entities and/or hardware, it is often prohibitively costly to investigate all user computer system errors. However, if a significant number of users experience a particular error, the amount of user dissatisfaction due to that error justifies an investigation of the problem, regardless of whether the problem is due to the developer's code itself or to an interaction with another party's code or hardware. Thus, it is important for the developer to be able to determine when errors have occurred, and to be able to classify those errors to recognize repeated occurrences of a specific problem.

A number of standard approaches exist in order to verify that a computer process or application (typically consisting of a single process) is operating as expected—or more usually to diagnose failures to operate as expected. These include, among other techniques (1) use of a live debugging or in-circuit emulation to trap execution when certain conditions are met; (2) use of instructions embedded in code (e.g. Assert or other instrumentation) to trace execution; (3) profiling or otherwise tracing the execution of the process' threads; and (4) recording a dump of process memory, including call stacks for subsequent analysis. Such solutions usually have significant drawbacks, however, such as requiring changes to the code (instrumentation); requiring diagnostic personnel to be available and on-site when a problem occurs (live debugging); seriously degrading computer performance (profiling, extensive logging or dumping memory); and/or requiring computer users to send large quantities of data back to the vendor (memory dumps). Thus, existing techniques have significant shortcomings, and in addition to these, for vendors who did not develop the code under analysis, techniques that require changes to the code are impractical.

BRIEF SUMMARY OF THE INVENTION

In embodiments of the invention, aspects of a process' call stacks are hashed, and the hash is used to capture the execution state of the process in a concise form and with minimal impact on the performance of the process and with no modification to the process code. Moreover, the hashes are very compact and contain no personally identifiable information. Thus, their transmission does not cause significant bandwidth reduction or raise privacy concerns. As such, the hashes can be transmitted to a vendor or developer for analysis conveniently and with minimal worry.

The use of hashes allows for the capture of an identifier of the execution state of a process in a concise fashion. This enables vendors and developers to determine the operational state of a process to validate that the process is executing in an expected manner and to diagnose failure of a process to execute as expected. A hanging process may also be diagnosed using the hash. Moreover, the hash allows vendors and developers to classify failures to associate them with their known root causes to support rapid customer feedback and to maximize efficiency of correction. Further, the hash provides a metric usable to prioritize diagnosis of failures.

A number of mechanisms and methodologies are usable to create call stack hashes. In an embodiment of the invention, ordered modules' identities on the stack are hashed to minimize the affect of patches and minor changes to the code. In an alternative embodiment of the invention, the ordered modules' identities are hashed in combination with some but not all offset information. This technique minimizes the affect of patches and minor changes to the code, yet also improves the ability to discriminate different execution paths.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3 illustrates an example of a call stack usable to create a call stack hash according to an embodiment of the invention;

DETAILED DESCRIPTION OF THE INVENTION

The present invention will be more completely understood through the following detailed description, which should be read in conjunction with the attached drawings. In this description, like numbers refer to similar elements within various embodiments of the present invention. Methods and systems for estimating bandwidth in broadband access networks and other networks will be described below. The skilled artisan will readily appreciate that the methods and systems described herein are merely exemplary and that variations can be made without departing from the spirit and scope of the invention.

Embodiments of the invention are illustrated as being implemented in a suitable computing environment. Although not required, the invention is described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment or to a single computing device.

Figure 1:
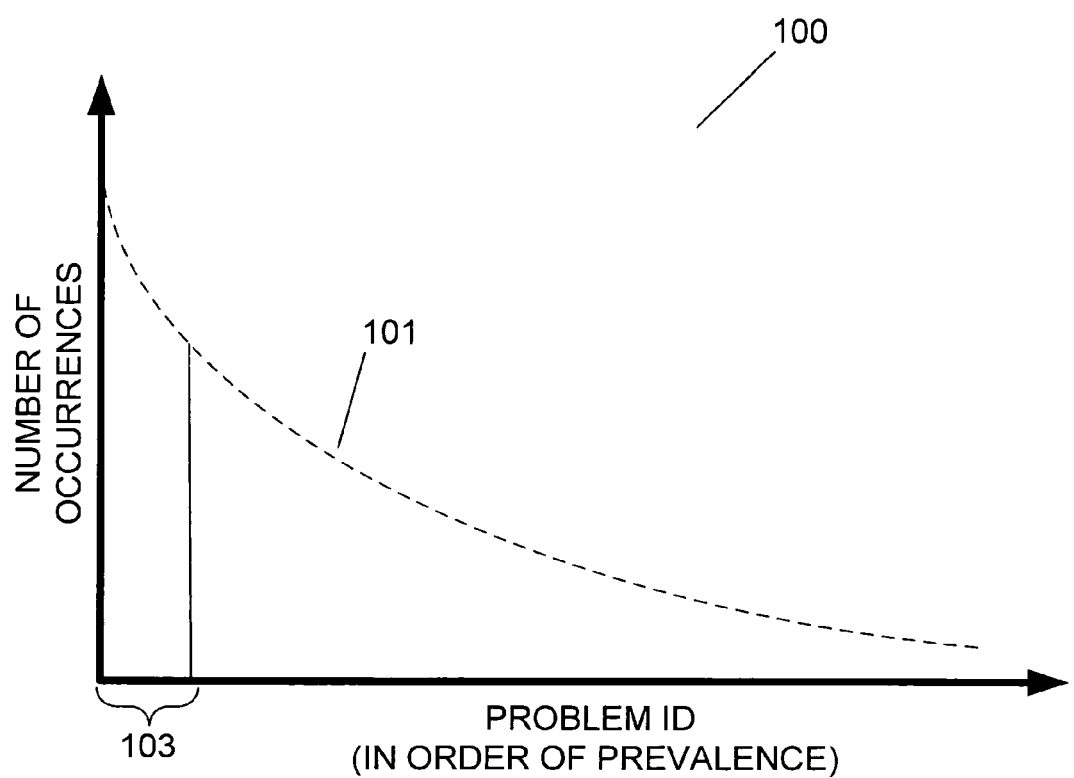
FIG. 1 illustrates an example plot showing a typical relationship between discrete software problems or bugs and their relative frequencies of occurrence.

As discussed above, it is important for a computer software vendor to be apprised of problems with their software, and to be able to accurately determine the frequency with which each problem occurs in order to properly allocate correctional resources to minimize customer dissatisfaction. FIG. 1 is an example plot showing a typical relationship between discrete software problems or bugs and their relative frequencies of occurrence. The plot 100 associates each problem, represented by a problem identifier on the abscissa, with its frequency of occurrence on the ordinate. In an embodiment of the invention, user machines report problems by sending a signature of the process state to the vendor. The association of problems and frequencies forms a curve 101. Different problems can occur with substantially different frequencies, and typically a small number of problems account for a large proportion of problem occurrences. For example, the problems in region 103 represent only a small fraction of the available problems, but occurrences of these problems account for a large proportion of overall user problems and hence dissatisfaction. Thus ideally the expenditure of correctional resources is prioritized to first address problems at the left of the plot, proceeding to the right as remaining resources warrant. For example, for problems that cause a significant number of user problems, the vendor may assign personnel to investigate. As part of this investigation, the vendor may solicit more data, e.g. memory dumps, from future users suffering the same problem.

Figure 2:
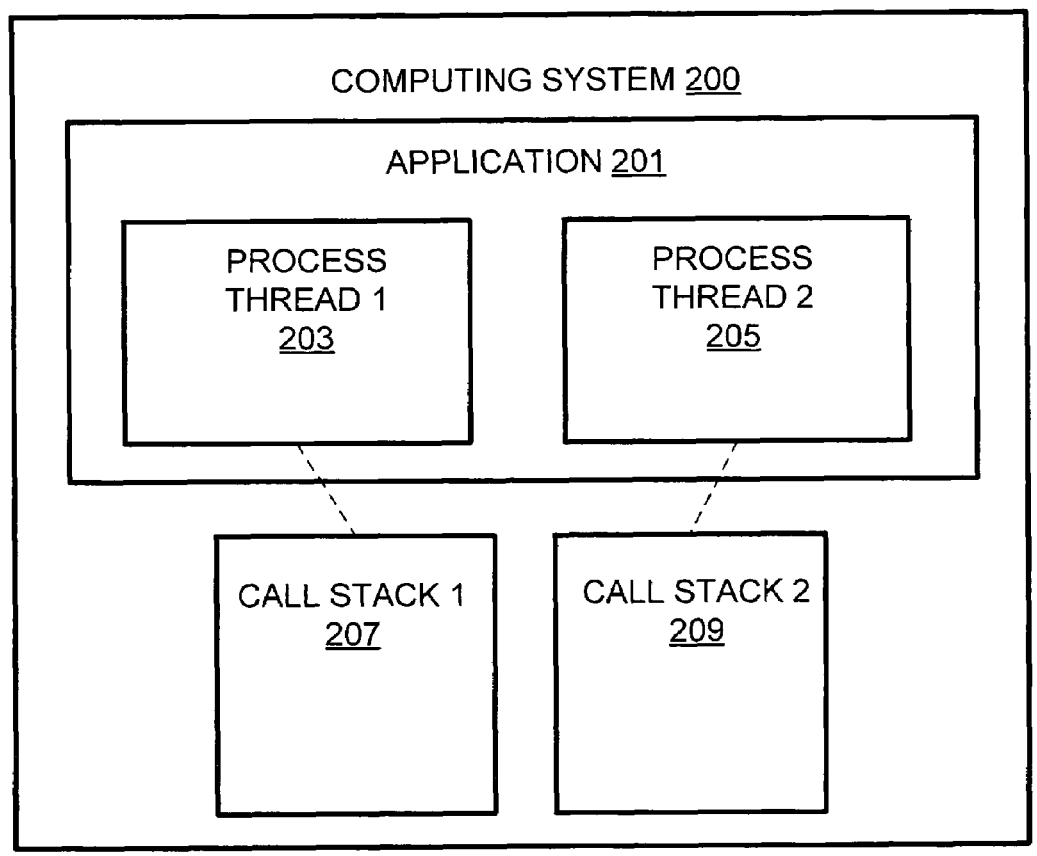
FIG. 2 is a simplified schematic representation of computer system entities and facilities involved in the execution of computer code according to an embodiment of the invention.

FIG. 2 is a simplified schematic representation of computer system entities and facilities involved in the execution of computer code, such as an application program. The computing system 200 exists as a set of interrelated structures in the memory of a computing device such as a personal computer. The memory may be of any type, but processes are typically run from within random access memory (RAM). The computing system 200 comprises an application 201, which is an example of a process. The application 201 is in turn comprised of one or more process threads or threads of execution 203, 205. For example, in a word processing application, one process thread 203 may provide user interface functionality while another 205 may provide real-time spell checking functionality.

Each process thread 203, 205 utilizes a call stack, 207, 209 respectively, to facilitate its operations, and thus the call stack represents the state of a thread at a given point in time. For example, the call stack can store, in a first-in/last-out manner, the function calls made by the thread. Typically the stack stores an identification both of the module called as well as the function invoked. Thus, since the call stacks 207, 209 represent the states of their respective threads 203, 205, the state of the call stacks 207, 209 represents the state of the application 201 as well. In some cases, one stack alone is sufficient to determine the state of the application 201.

Figure 3:
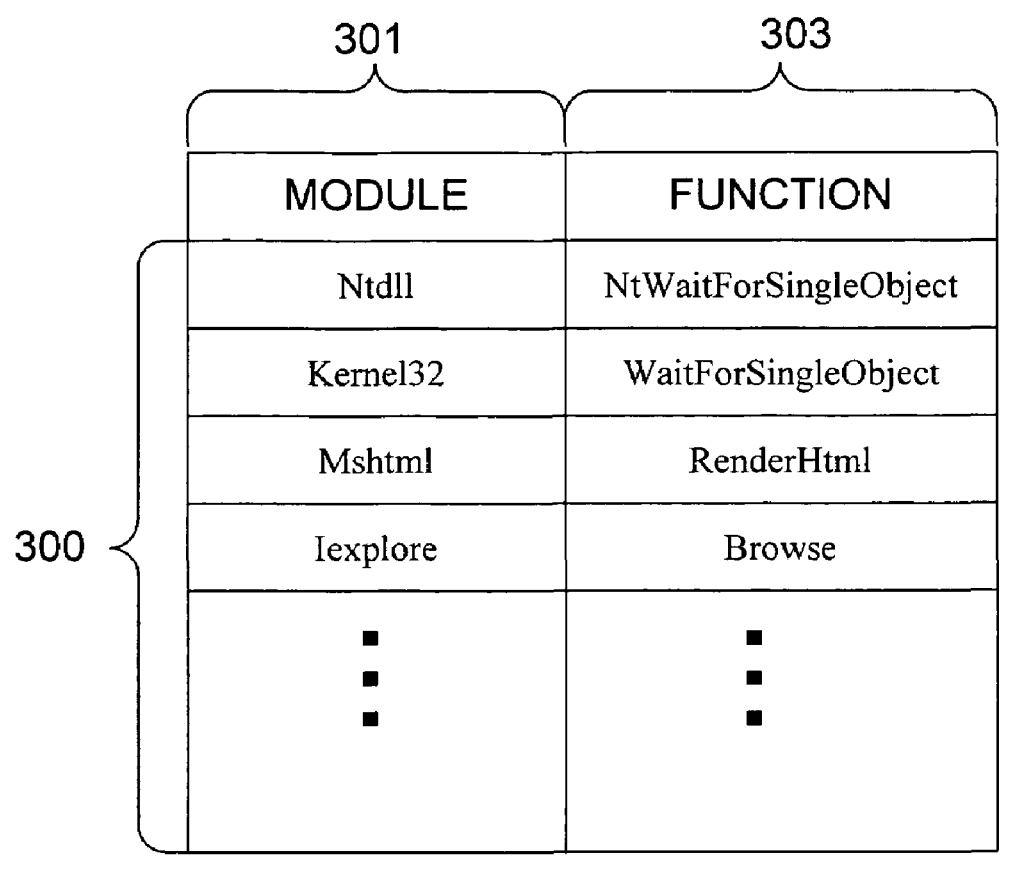

An example of a call stack is shown in FIG. 3. The stack 300 comprises two primary fields, labeled in the drawing as "Module" 301 and "Function" 303. The process field 301 lists the modules called by the owner thread of the stack or by processes called by the owner of the stack. The function field 303 lists the functions invoked on the respective associated called modules. Note that although this simplified representation lists the functions as strings, the actual representation typically would entail large hex numbers instead.

From the above, it can be seen that the accurate classification of problems is critical for efficient allocation of correctional resources. Thus, the signature sent from a user's computer to the software vendor pursuant to an irregularity in a process (such as when an application hangs or becomes unresponsive) should serve to identify the state of the process so that similar occurrences can be tracked. In an embodiment of the invention, the call stack of a process or thread is selectively hashed to specifically identify the state of the process without distinguishing between minor code differences such as patches or updates.

Figure 4:
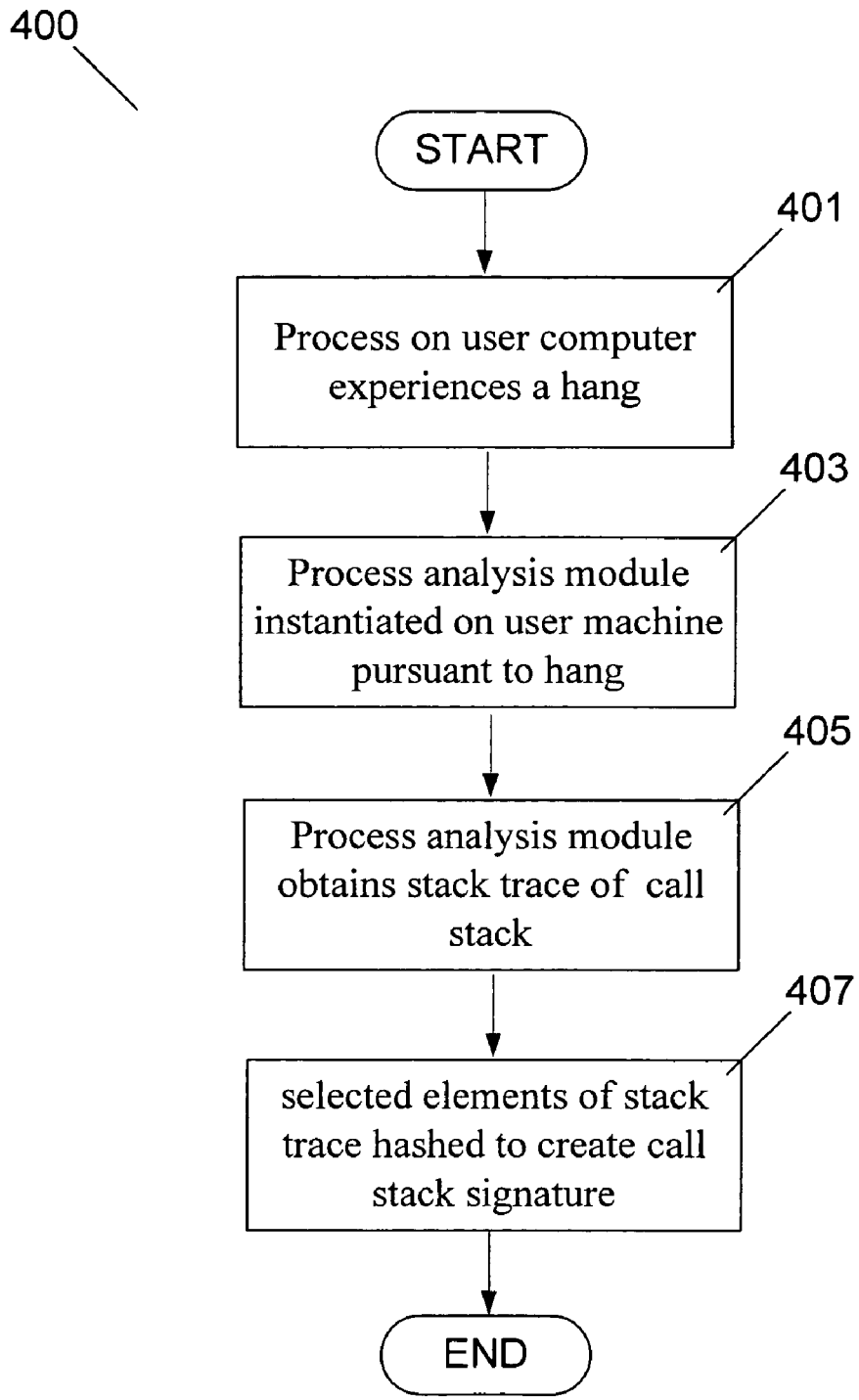
FIG. 4 is a flow chart illustrating a process for creating a call stack hash usable as a process state signature in an embodiment of the invention.

FIG. 4 illustrates in overview a process for creating a call stack hash usable as a process state signature in an embodiment of the invention. Ideally, the steps of the flow chart of FIG. 4 are executed on the user machine unless otherwise noted. In step 401 of flow chart 400, a process on the user computer experiences an irregularity such as a hang. At step 403, a process analysis module is instantiated on the user machine pursuant to the process irregularity. At step 405, the process analysis module obtains the stack trace of the appropriate call stack. The stack trace lists modules called and the function offsets within each module.

When an event occurs for which the execution state of one or more threads is required, obtaining accurate and complete stack traces a first step in constructing a hash of the stack trace. A poor stack trace results in a hash that does not correlate well to the thread's actual execution path. This problem is compounded by the fact that symbols are often not available on the user computer. Without symbols, some processor families and debugger stack walkers perform very poorly, for example if Frame pointer omission (FPO) is used with 32-bit Intel architecture (×86) processors. Disabling this optimization when the applications are compiled significantly improves the ability to correctly determine signatures for processes of interest in an embodiment of the invention.

In an embodiment of the invention, a special algorithm is used to choose the parts of the stack trace to convey in the hash after a reasonably accurate and complete stack trace has been obtained. Of course, the most accurate algorithm would be to hash the address for every function call on the stack. This provides the most complete representation of each stack frame, since it provides the instruction pointer for each frame. This method has a number of disadvantages, however. For example, if even very minor changes occur to the code, including, for example due to a minor code patch or version change, all the hashes for a given execution state could change. An incremental improvement would be to use the identity of a module, combined with the offset within the module, for each call within the stack frame. These would be invariant if the location of the module were to shift, for instance due to a change in another module. This is still not ideal, however, since there can still be a significant change to the hashes in the event of code changes.

In an embodiment of the invention, hashing of a list of just the modules on the call stack provides a reasonable correlation to real hang bugs without suffering from the same effects. One disadvantage of this approach is that in a fair proportion of cases, the generated hash maps to multiple bugs due to a loss of information from the stack trace. This is sometimes too large of a loss for the hash to be useful for recording the application state. Thus, in a further embodiment of the invention, a hybrid approach is applied, whereby module names only are used for common binary images, such as predetermined core operating system components, and module name/offset pairs are used for other stack frames. This serves the dual goals of not creating as many distinct problem categories for minor code changes while minimizing the mapping of one hash to multiple bugs.

At step 407, the selected elements of the stack trace are hashed to create the signature. A hash is desirable to provide a compact encapsulation of the information chosen from the stack trace. In an embodiment of the invention, an MD5 hash algorithm is used since it is only 16 bytes long and minimizes the probability of collisions between different sets of information. This MD5 hash therefore can quickly be transmitted to a vendor's site, for example for use in identifying a problem with a process code or code/hardware combinations or code/code combinations. A simple serial listing of the selected stack trace elements can be hashed to create the desired signature. The invention is not limited to a particular arrangement of stack trace elements that are hashed, however serial listing of the stack trace elements in order of the original call stack is preferred, especially when using only module names.

Figure 5:
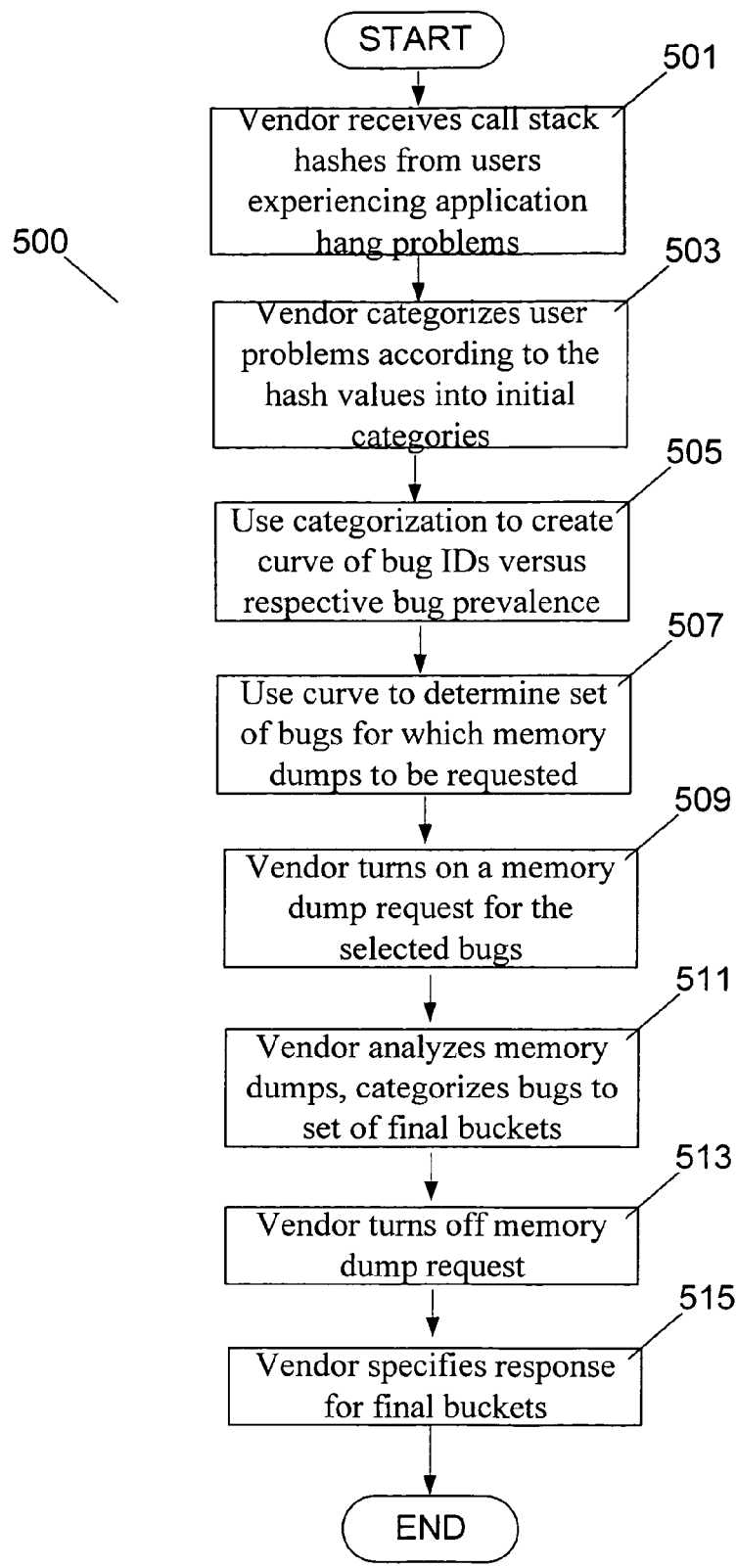
FIG. 5 is a flow chart showing an overall error detection and correction cycle from the vendor's standpoint according to an embodiment of the invention.
Figure 6:
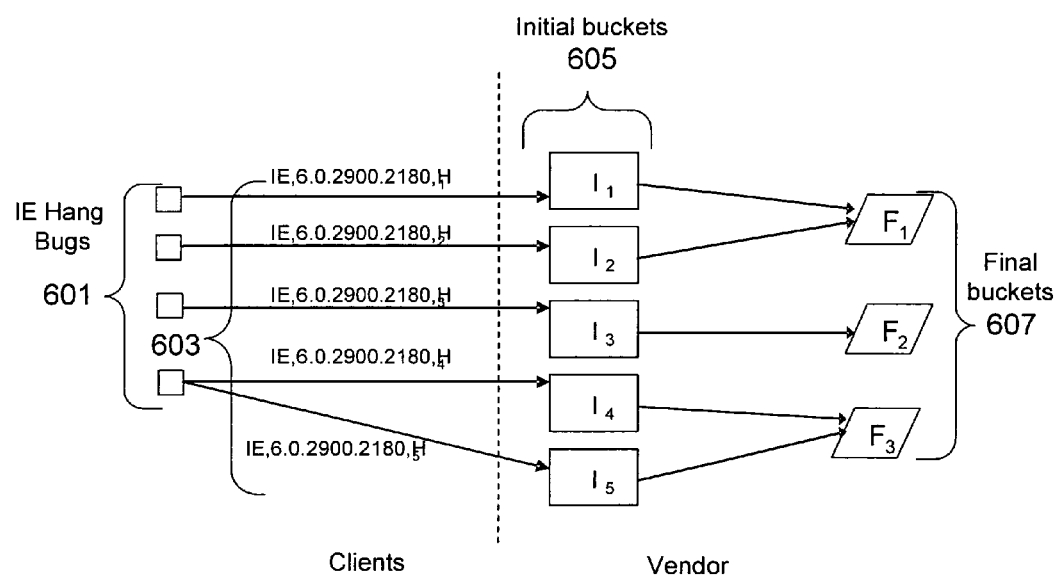
FIG. 6 is a schematic representation showing the flow and use of error identification information according to an embodiment of the invention.

FIG. 5 is a flow chart showing the overall error detection and correction cycle from the vendor's standpoint according to an embodiment of the invention. In step 501 of the flow chart 500, the vendor receives a call stack hash from each of a plurality of users experiencing various application hang problems. These problems are represented in FIG. 6 as elements 601, and the reporting of the hash values is represented by transmissions 603. After receiving the hash values, the vendor initially categorizes the user problems according to the hash values in step 503, so that six problem "initial buckets" 605 are identified. This categorization is used to create a plot of bug IDs versus bug prevalence in step 505 as shown in FIG. 1.

The plot of bug IDs versus bug prevalence is used in step 507 to determine a set of bugs for which full memory dumps should be requested. In step 509, the vendor turns on a memory request for the selected bugs, such that when a hash for one of the selected bugs is received at the vendor, a full memory dump is requested. In step 511, after receiving a number of memory dumps for one or more of the selected bugs, the vendor analyzes the memory dumps to determine which one or more of the initial buckets 605 correspond to each of a set of final buckets 607. In step 513, the vendor turns off the memory dump request for each bug for which designation to a final bucket 607 was made. Finally, in step 515, the vendor specifies a response to be sent to each user from whom a problem hash that is represented in a final bucket is received. The response may be a patch or solution, a reference to a patch or solution, or an identification of a third party, such as a hardware vendor, from whom assistance should be sought.

Using the call stack hash technique described herein, a vendor is able to accurately identify process problems to determine which problems are causing the most user dissatisfaction. The vendor can then collect process information, e.g., memory dumps, in a targeted manner to minimize user overhead in problem resolution. Finally, the vendor can match a solution with each call stack signature hash, so that users reporting problems can be immediately linked to a solution.

It will be appreciated that a new and useful system for software problem identification has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of responding to an error in the execution of a process on a computing device, wherein the process uses a call stack to execute, the method comprising:
    obtaining a trace of the call stack, the trace identifying programmatic modules and an associated respective offset within each module;

selecting a subset of the programmatic modules and a subset of the respective offsets within each module wherein
    selecting a subset of the programmatic modules and a subset of the offsets comprises selecting a subset of the programmatic modules and a subset of the offsets that does not include all offsets associated, in the trace of the call stack, with the selected subset of programmatic modules and wherein
        the modules of the subset of the programmatic modules for which an associated offset is not included in the selected subset of the offsets comprise a predetermined set of common modules wherein
            the predetermined set of common modules comprises operating system modules associated with the operating system of the computing device;
performing a hash operation on the selected subsets of programmatic modules and offsets to derive a single hash value; and
transmitting the single hash value from the computing device over a network to a receiving device.

2. The method according to claim 1, wherein the hash operation is an MD5 hash.

3. The method according to claim 2, wherein performing a hash operation on the selected subsets of programmatic modules and offsets comprises applying the hash operation to a serialized representation of the selected subsets of programmatic modules and offsets.

4. The method according to claim 1, wherein the process is executing as part of a computer program application.

5. The method according to claim 4, wherein the computer program application is executing via multiple threads and the process corresponds to one of the threads of the application.

6. The method according to claim 1, wherein the error in the execution of a process comprises a hang.

7. A computer-readable medium having thereon computer-readable instructions for performing a method of responding to an error in the execution of a process on a computing device, wherein the process uses a call stack to execute, the computer-readable instructions comprising instructions for:
    obtaining a trace of the call stack, the trace identifying programmatic modules and an associated respective offset within each module;
    selecting a subset of the programmatic modules and a subset of the respective offsets within each module wherein
        the instructions for selecting a subset of the programmatic modules and a subset of the offsets comprise instructions for selecting a subset of the programmatic modules and a subset of the offsets that does not include all offsets associated, in the trace of the call stack, with the selected subset of programmatic modules wherein
            the modules of the subset of the programmatic modules for which an associated offset is not included in the selected subset of the offsets comprise a predetermined set of common modules wherein
                the predetermined set of common modules comprises operating system modules associated with the operating system of the computing device;
performing a hash operation on the selected subsets of programmatic modules and offsets to derive a single hash value; and
transmitting the single hash value from the computing device over a network to a receiving device.

8. The computer-readable medium according to claim 7, wherein the hash operation is an MD5 hash.

9. The computer-readable medium according to claim 8, wherein the instructions for performing a hash operation on the selected subsets of programmatic modules and offsets comprise instructions for applying the hash operation to a serialized representation of the selected subsets of programmatic modules and offsets.

10. The computer-readable medium according to claim 7, wherein the process is executing as part of a computer program application.

11. The computer-readable medium according to claim 10, wherein the computer program application is executing via multiple threads and the process corresponds to one of the threads of the application.

12. The computer-readable medium according to claim 7, wherein the error in the execution of a process comprises a hang.

\* \* \* \* \*